(12) United States Patent
Choi (10) Patent No.: US 8,746,987 B2
(45) Date of Patent: Jun. 10, 2014

(54) FIELD ASSEMBLED OPTICAL CONNECTOR

(75) Inventor: An Joon Choi, Seoul (KR)

(73) Assignee: A.J. World Co., Ltd., Seoul (KR)

( * ) Notice: Subject to any disclaimer, the term of this patent is extended or adjusted under 35 U.S.C. 154(b) by 315 days.

(21) Appl. No.: 13/284,144

(22) Filed: Oct. 28, 2011

(65) Prior Publication Data

US 2012/0106899 A1    May 3, 2012

(30) Foreign Application Priority Data

Oct. 28, 2010  (KR) .......................... 10-2010-0106257
Jul. 29, 2011  (KR) .......................... 10-2011-0075927

(51) Int. Cl.
*G02B 6/36*   (2006.01)

(52) U.S. Cl.
USPC ................................ 385/81; 385/78; 385/87

(58) Field of Classification Search
USPC .......................................... 385/78, 81, 86, 87
See application file for complete search history.

(56) References Cited

U.S. PATENT DOCUMENTS

| | | | | |
|---|---|---|---|---|
| 7,280,733 | B2 * | 10/2007 | Larson et al. | 385/139 |
| 7,731,429 | B2 * | 6/2010 | Ohtsuka et al. | 385/81 |
| 7,942,590 | B2 * | 5/2011 | Lu et al. | 385/78 |
| 8,295,669 | B2 * | 10/2012 | Park et al. | 385/135 |
| 2002/0191919 | A1 | 12/2002 | Nolan | |
| 2011/0044588 | A1 * | 2/2011 | Larson et al. | 385/81 |
| 2011/0176774 | A1 | 7/2011 | Barnes et al. | |

FOREIGN PATENT DOCUMENTS

| | | | | |
|---|---|---|---|---|
| CN | 102122031 A | 7/2011 | | |
| CN | 102122032 A | 7/2011 | | |
| GB | 2485070 A | * 5/2012 | ............... | G02B 6/38 |
| KR | 10-2005-0113187 A | 12/2005 | | |
| KR | 10-2008-0094026 A | 10/2008 | | |
| KR | 10-2009-0107278 A | 10/2009 | | |
| KR | 10-0985146 B1 | 10/2010 | | |
| KR | 10-2011-0037342 A | 4/2011 | | |
| WO | WO 2008/091719 A2 | 7/2008 | | |
| WO | WO 2009/148797 A1 | 12/2009 | | |

OTHER PUBLICATIONS

Combined Search and Examination Report issued Feb. 27, 2012 in counterpart application GB1118676.4.
Combined Search and Examination Report issued Dec. 12, 2012 in counterpart application GB1218148.3.
Combined Search and Examination Report issued Dec. 12, 2012 in counterpart application GB1218149.1.
Notice of Allowance issued Dec. 20, 2011 in counterpart application KR 10-20100106257 (3 pages, in Korean).
Notice of Allowance issued Jul. 30, 2012 in counterpart application KR 10-2011-0075927 (3 pages, in Korean).

* cited by examiner

*Primary Examiner* — Daniel Petkovsek
(74) *Attorney, Agent, or Firm* — NSIP Law (57) ABSTRACT

A field assembled optical connector is provided. The connector includes a ferrule having an optical fiber, a plug integrally forming a housing coupling part, and an open-topped boot into which an optical cable is inserted, an optical connection member to connect an optical fiber of the ferrule inserted at a tip end side and an optical fiber of the optical cable, a boot cover rotatably coupled to the plug on a side of the boot, a screw cap screw-coupled to the boot and the boot cover to fix the optical cable inserted into the boot and the boot cover, and a plurality of ring-shaped bosses arranged at inner sides of the boot and the boot cover.

13 Claims, 9 Drawing Sheets

FIELD ASSEMBLED OPTICAL CONNECTOR

CROSS-REFERENCE TO RELATED APPLICATION(S)

This application claims the benefit under 35 U.S.C. §119(a) of Korean Patent Application Nos. 10-2010-0106257 and 10-2010-075927 filed on Oct. 28, 2010 and Jul. 29, 2011, respectively, in the Korean Intellectual Property Office, the entire disclosure of which is incorporated herein by reference for all purposes.

BACKGROUND OF THE INVENTION

1. Field of the Invention

The present invention relates to an optical connector, and more particularly to a field assembled optical connector which allows optical fibers to be easily arranged, connected, and assembled in the field for optical connections.

2. Description of the Prior Art

Optical connectors for connecting optical fibers as an optical linking means of various communication devices, precision measurers, audio/video devices, sensors, etc., which are used as signal transmitting mediums, are generally used. In recent years, machined connector parts are finally assembled to connect optical fibers in the field by manufacturing companies, making it possible to easily assemble the parts. Meanwhile, various field assembled optical connectors are used to peel sheaths of optical fibers or optical cables, cut and simply assemble the optical fibers or optical cables, so that a plurality of optical lines can be connected promptly and easily as FTTH (Fiber To The Home) services are expanded.

A typical field assembled optical connector mainly includes a ferrule for connection of optical fibers, a boot for preventing an optical fiber exposed to the outside from being damaged due to its bending to protect the optical fiber, and a frame surrounding and protecting an outer side of the ferrule.

However, most optical connectors are not suitable for installation in the field, and it is not easy to connect optical fibers in the field.

Meanwhile, Korean Patent No. 10-0985146 discloses an FC type field assembled optical connector as a conventional field assembled optical connector.

However, since the conventional FC type field assembled optical connector includes a separate flange to protect a core wire of the ferrule and a clamp for arranging a core wire of an optical cable, the number of parts and manufacturing costs increase. Further, since the assembled structure of the optical connector is complex, it cannot be assembled in the field promptly.

In an FTTH system, an optical cable is connected, for example, to subscriber equipment at home, and an end of the optical cable is finished in the form of a connector and is installed on a wall surface, in which case an FTTH operator sets the optical cable to be longer than an actual length by several meters to introduce the optical cable into a home, considering connections between optical cables. Further, the operator cuts the optical cable in an optical terminal box by a necessary length in a construction field, and after assembling the optical connector at an end of the optical cable, the operator connects the optical terminal box to an optical adapter within a home to install the optical cable.

Although an LC, ST, FC, and SC optical connectors are widely used as optical connectors used for connection of optical cables, most optical connectors are not suitable for installation in the field and it is not easy to connect optical fibers in the field.

SUMMARY OF THE INVENTION

Accordingly, the present invention has been made to solve the above-mentioned problems occurring in the prior art, and the present invention provides a field assembled optical connector, by which an optical fiber can be easily inserted and be arranged and connected promptly and simply, and the connector can be assembled promptly and simply.

The present invention also provides an FC type field assembled optical connector, by which the number of parts and manufacturing costs can be reduced, and optical fibers can be arranged and connected promptly and simply and the connector can be assembled promptly and simply.

In accordance with an aspect of the present invention, there is provided a field assembled optical connector including: a ferrule having an optical fiber at a center thereof; a plug integrally forming a housing coupling part formed at one side thereof, and a open-topped boot into which an optical cable is inserted; an optical connection member inserted into and fixed to the plug to connect an optical fiber of the ferrule inserted at a tip end side and an optical fiber of the optical cable inserted at a rear end side therein; a boot cover rotatably coupled to the plug on a side of the boot to open and close an opened upper side of the boot while pivoting upward and downward and fix the optical cable together with the boot; a screw cap screw-coupled to the boot and the boot cover to fix the optical cable inserted into the boot and the boot cover; and a plurality of ring-shaped bosses arranged at inner sides of the boot and the boot cover and attached to an outer sheath of the optical cable inserted into the boot to press the optical cable while being spaced apart from each other by a predetermined distance.

The boot cover has press bosses protruding toward the boot on at least one of the ring-shaped bosses formed at an inner side thereof.

The press bosses include: a first press boss disposed at a central portion of the ring-shaped boss; a second press boss disposed on a left side of the first press boss; and a third press boss disposed on a right side of the first press boss. The second press boss and the third press boss are spaced apart from each other at an interval equal to a diameter of a circular optical cable inserted into the boot.

The optical connection member includes: an optical connection housing including a ferrule insertion part formed at a front side thereof, an optical fiber insertion part formed at a rear side thereof, and an open-topped optical fiber connection part having an optical fiber connection recess integrally formed between the ferrule insertion part and the optical fiber insertion part to connect the optical fiber of the ferrule and the optical fiber of the optical cable; an optical connection housing cover coupled to the optical fiber connection part at an upper side thereof to cover the optical fiber connection part and press the optical fibers connected within the optical fiber connection recess; and an optical connection housing holder coupled to the optical connection housing so that an inner peripheral surface thereof surrounds the optical connection housing and the optical connection housing cover, to press the optical connection housing cover.

A protrusion protruding upward is formed lengthwise at one side of an upper surface of the optical connection housing cover, and the optical connection housing holder is moved toward a front side of the optical connection housing so that an inner upper side thereof pushes the protrusion to press the optical connection housing cover.

An inner surface of the optical connection housing holder contacting the protrusion is inclined upward toward a progress direction.

The optical connection member includes: a first guide groove inclined toward the optical fiber connection recess at both sides of the optical fiber connection recess to guide the optical fibers entering the optical fiber connection part to the optical fiber connection recess; and a second guide groove inclined toward the optical fiber connection recess at both ends of the optical connection housing cover to guide the optical fibers to the optical fiber connection recess together with the first guide groove.

The second guide groove is formed longer than the first guide groove such that a front side of the second guide groove which becomes narrower is located in front of a front side of the first guide groove.

The plug has a coupling hole formed in the accommodation part toward the boot, and a tapered annular boss coupled to the coupling hole to fix the optical connection housing within the accommodation part is formed at an end of the optical fiber insertion part of the optical connection housing.

The annular boss is exposed to an inner side of the boot while being coupled to the coupling hole.

In accordance with another aspect of the present invention, there is provided a field assembled optical connector including: a ferrule having an optical fiber at a center thereof; a connector housing; a plug having an accommodation part inserted into and coupled to the connector housing at one side thereof, and an open-topped boot integrally formed at one side of the accommodation part and having a first screw portion on an outer peripheral surface thereof to press and fix an optical cable; an optical connection member for connecting an optical fiber of the ferrule inserted into the plug to be fixed and inserted from a tip end side thereof and an optical fiber of the optical cable inserted at a rear end side thereof therein; a boot cover having a second screw portion corresponding to the first screw portion on an outer peripheral surface thereof and pivotally coupled to the plug on a side of the boot to open and close an opened upper side of the boot while pivoting upward and downward and fix the optical cable together with the boot; and a screw cap screw-coupled to the boot and the boot cover to fix the optical cable inserted into the boot and the boot cover, wherein the boot and the boot cover have a plurality of ring-shaped bosses arranged at inner sides of the boot and the boot cover and attached to an outer sheath of the optical cable inserted into the boot to press the optical cable while being spaced apart from each other by a predetermined distance, and the boot cover has press bosses protruding toward the boot on at least one of the ring-shaped bosses formed at an inner side thereof.

A boss is formed on an outer peripheral surface of the housing coupling part and a separation preventing step for preventing separation of the housing is formed at a lower side of the boss, a ring portion coupled between the boss and the separation preventing step is formed on an inner peripheral surface of the housing, and an extension is formed at a front side of the screw cap.

In accordance with still another aspect of the present invention, there is provided a field assembled optical connector including: a ferrule having an optical fiber at a center thereof; a plug integrally forming a housing coupling part formed at one side thereof, and an open-topped boot into which an optical cable is inserted; an optical connection member inserted into and fixed to the plug to connect an optical fiber of the ferrule inserted from a tip end thereof and an optical fiber of the optical cable inserted from a rear end thereof therein; a boot cover pivotally coupled to the plug on a side of the boot to open and close an opened upper side of the boot while pivoting upward and downward and fix the optical cable together with the boot; and a screw cap screw-coupled to the boot and the boot cover to fix the optical cable inserted into the boot and the boot cover; a housing coupled to the housing coupling part; and a protection cap coupled to a tip end of the optical connection member to protect the ferrule, wherein an annular boss is formed at one side of a lower circumference of an outer peripheral surface of the housing coupling part, an annular separation preventing step for preventing separation of the housing is formed at one side of the annular boss, an annular ring portion coupled between the annular boss and the separation preventing step is formed on an inner peripheral surface of the housing, a front side of the screw cap is formed by a length long enough to cover the optical connection member coupled to the plug and inserted into the plug, and an extension for moving the housing forward and supporting the housing with the separation preventing step is formed on a front side thereof to push the housing forward so that the annular ring portion of the housing passes by the annular boss of the housing coupling part to be coupled between the separation preventing step and the annular boss when coupled to the plug.

According to the field assembled optical connector of the first embodiment of the present invention, an optical fiber of an optical cable can be safely and easily inserted into an optical connection member in a process of connecting the optical fiber. Further, a separate process of assembling a boot to protect an optical cable can be omitted, and a core wire arranging effect can be increased by firmly fixing a sheath close to an optical fiber of a connected optical cable. Furthermore, optical cable having different shapes such as a circle or a rectangle can be fixed firmly. Thus, an optical fiber can be arranged and connected promptly and simply and the connector can be assembled promptly and simply.

According to the field assembled optical connector of the second embodiment of the present invention, an optical fiber of an optical cable can be safely and easily inserted into an optical connection member in a process of connecting the optical fiber. Further, a core wire arranging effect can be increased by firmly fixing a sheath close to an optical fiber of a connected optical cable. Furthermore, since separate parts for protecting a plug and an optical connection member can be omitted, the number of parts and manufacturing costs are reduced and a manufacturing process is simplified. Moreover, a housing can be completely coupled and fixed simply though a process of fastening a screw cap. Thus, an optical fiber can be arranged and connected promptly and simply and the connector can be assembled promptly and simply.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, field assembled optical connectors according to exemplary embodiments of the present invention will be described in detail with reference to the accompanying drawings.

Figure 1:
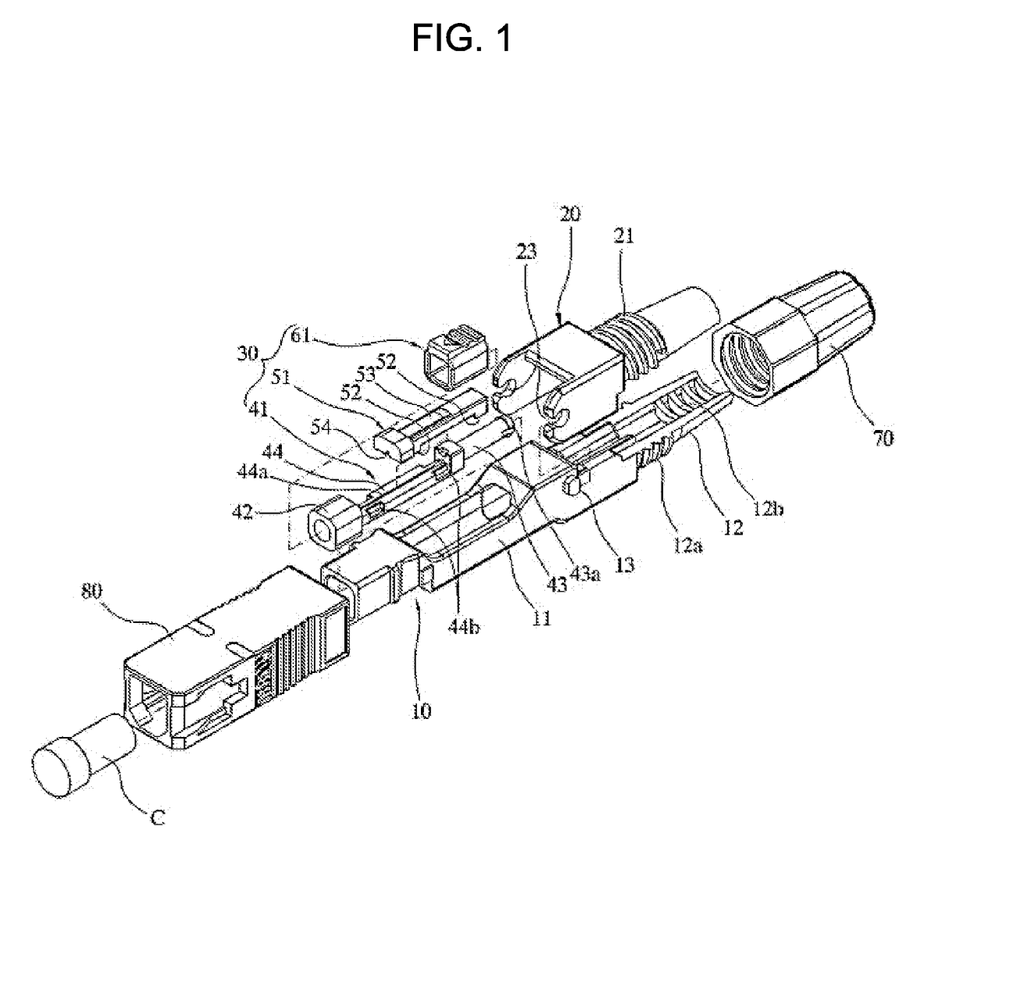
FIGS. 1 and 2 are exploded perspective views illustrating a field assembled optical connector according to the first embodiment of the present invention.
Figure 2:
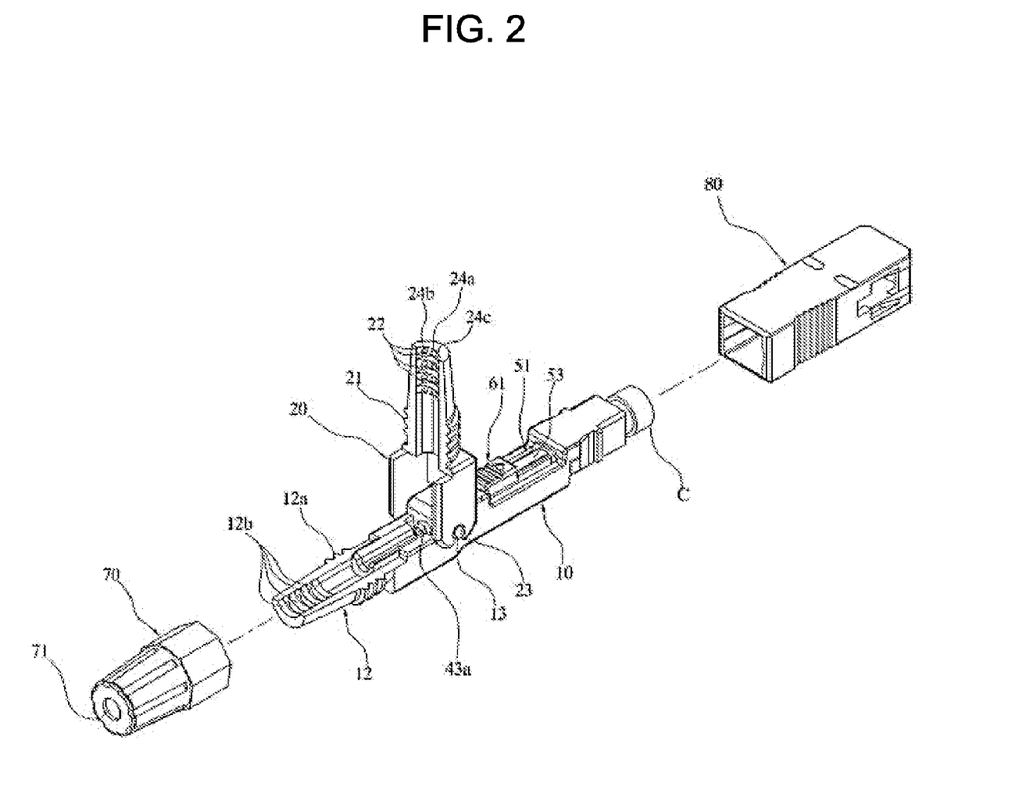
Figure 3:
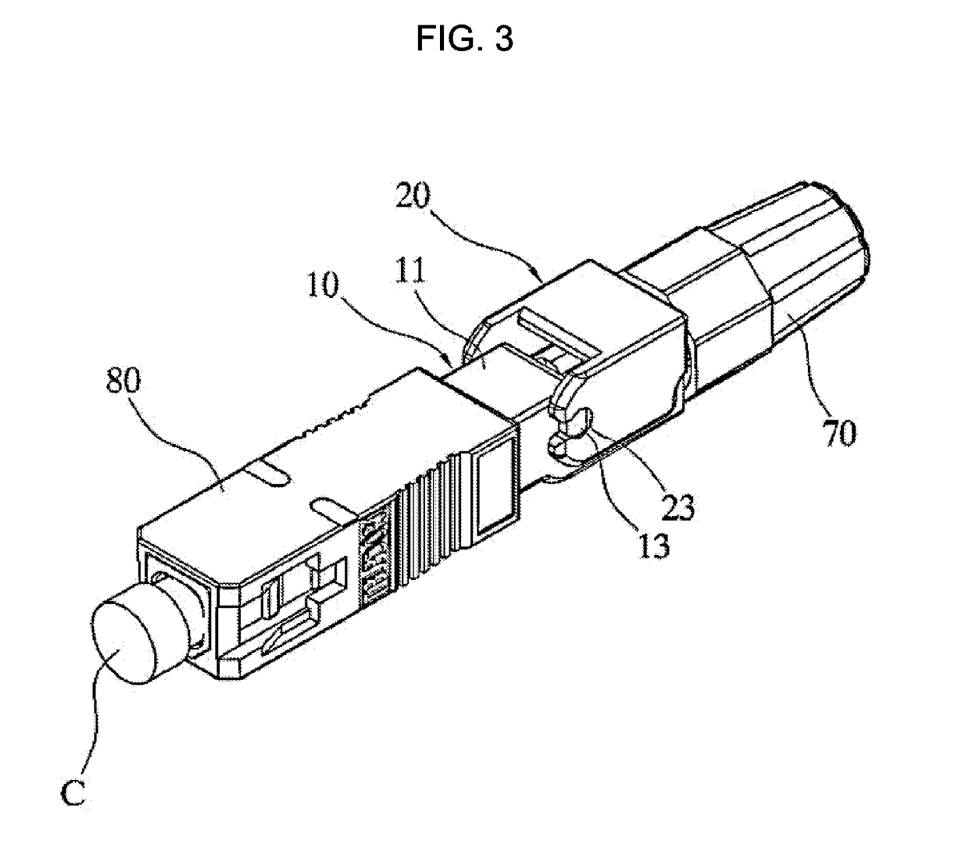
FIG. 3 is a perspective view illustrating an assembled state of the field assembled optical connector according to the first embodiment of the present invention.

FIGS. 1 and 2 are exploded perspective views illustrating a field assembled optical connector according to the first embodiment of the present invention. FIG. 3 is a perspective view illustrating an assembled state of the field assembled optical connector according to the first embodiment of the present invention.

Figure 4:
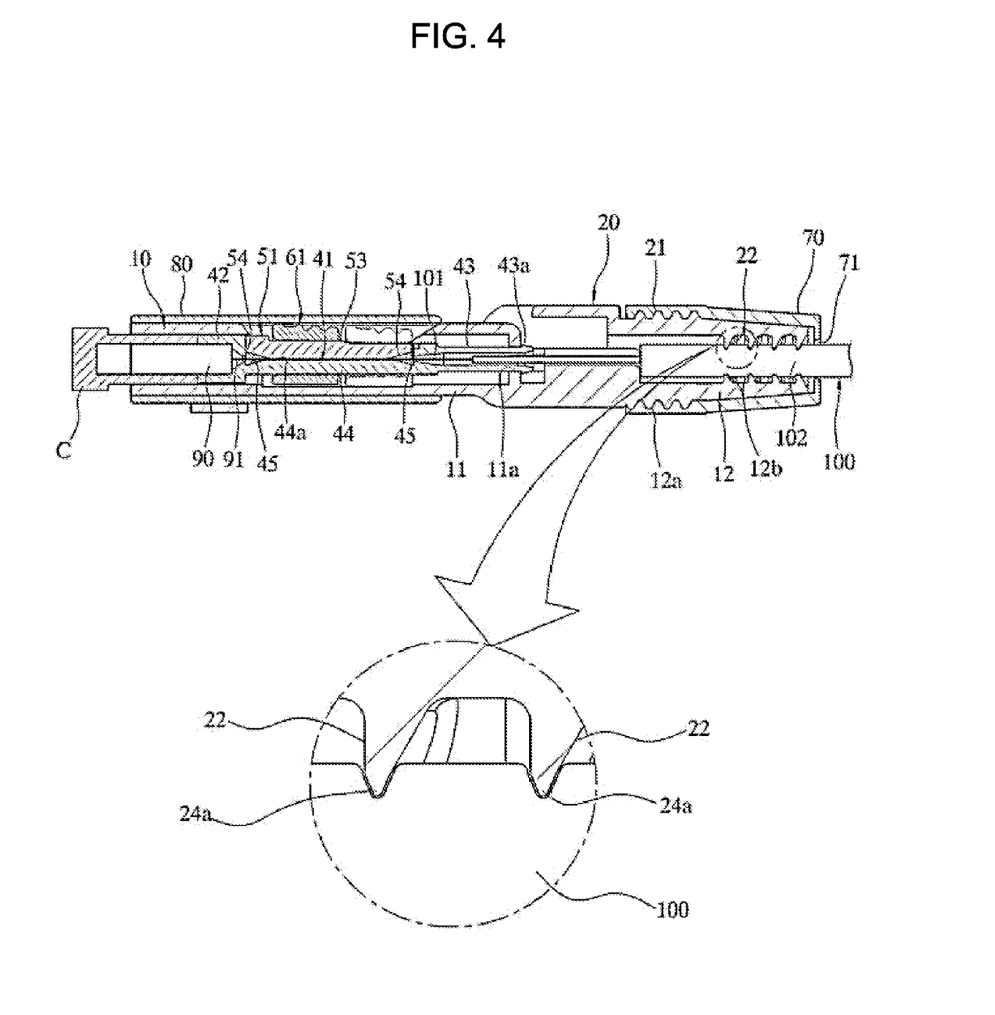
FIG. 4 is a front sectional view illustrating a circular optical cable fixed to the field assembled optical connector according to the first embodiment of the present invention.

FIG. 4 is a front sectional view illustrating a circular optical cable fixed to the field assembled optical connector according to the first embodiment of the present invention.

Figure 5:
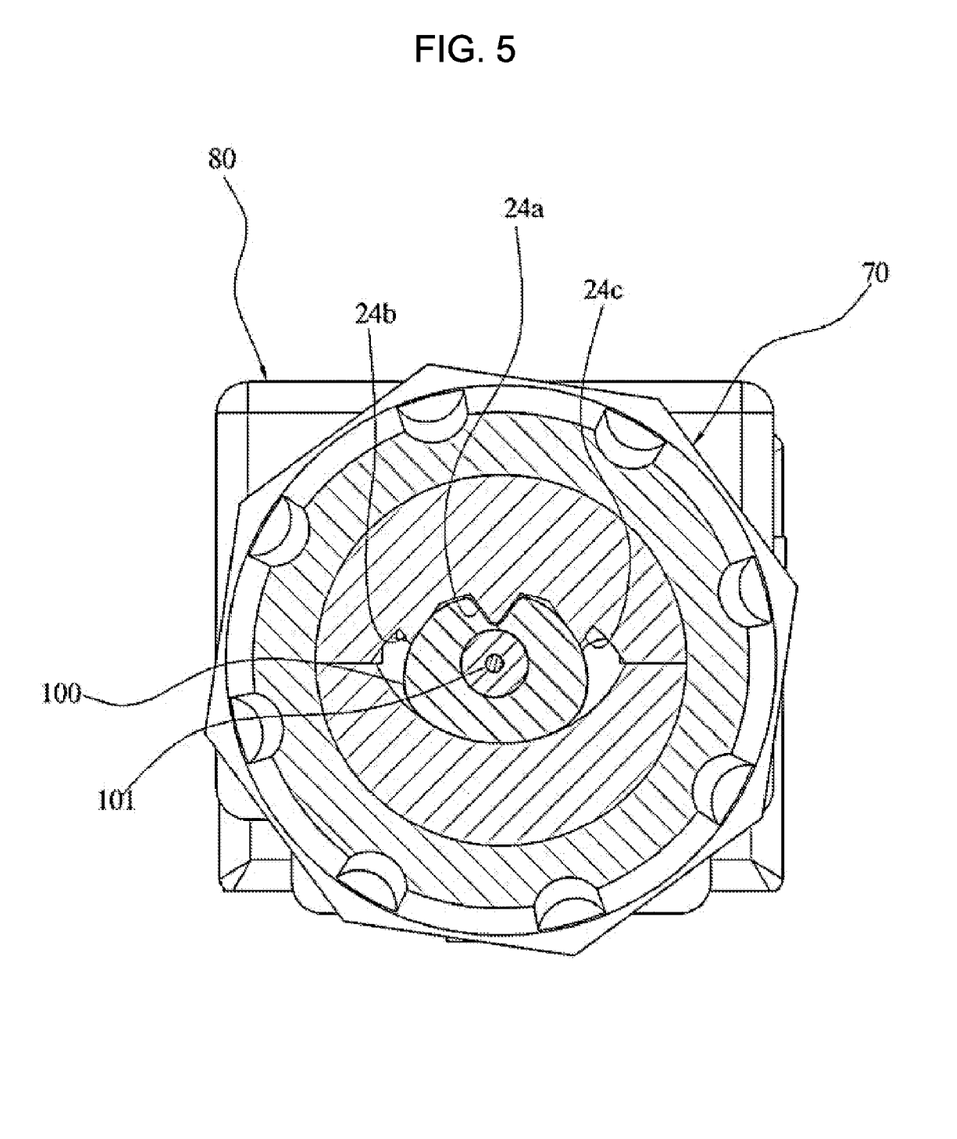
FIG. 5 is a side sectional view illustrating a circular optical cable fixed to the field assembled optical connector according to the first embodiment of the present invention.
Figure 6:
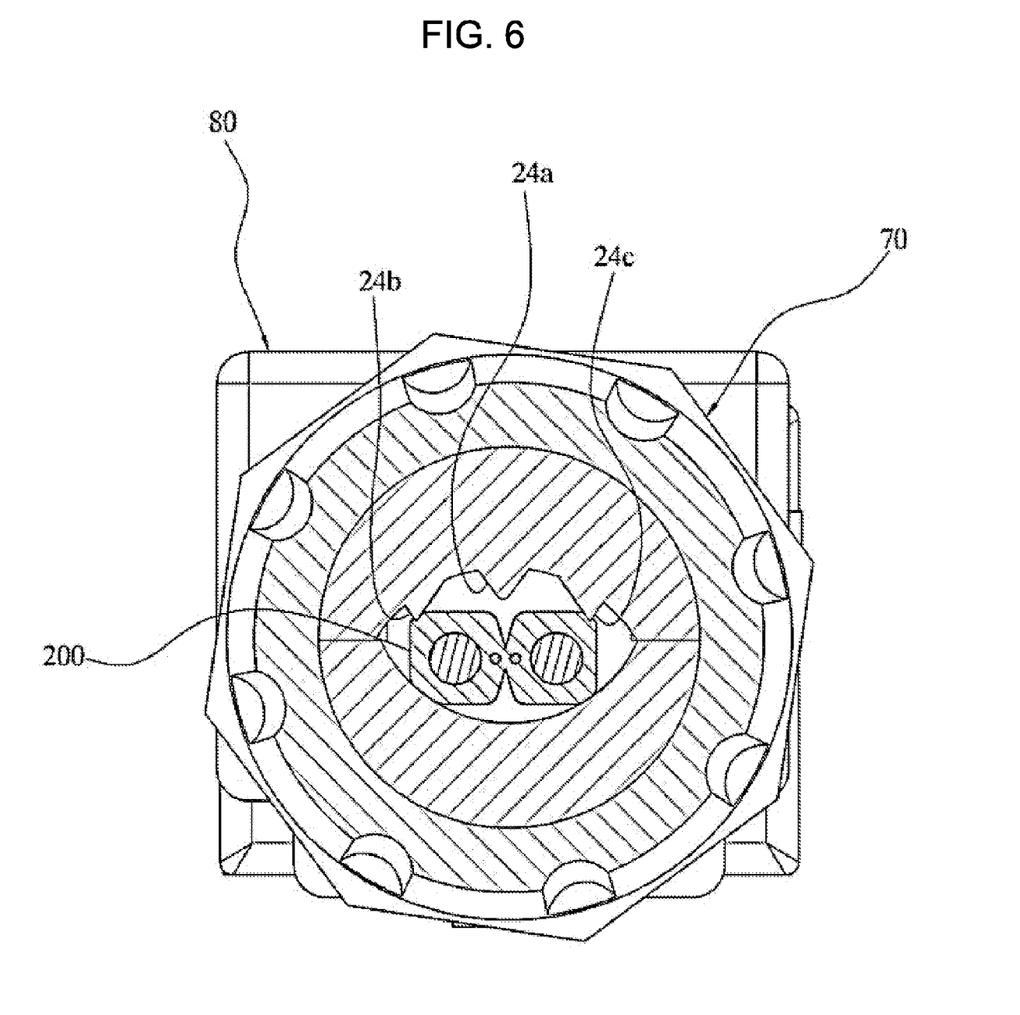
FIG. 6 is a side sectional view illustrating a rectangular optical cable fixed to the field assembled optical connector according to the first embodiment of the present invention.

FIG. 5 is a side sectional view illustrating a circular optical cable fixed to the field assembled optical connector according to the first embodiment of the present invention. FIG. 6 is a side sectional view illustrating a rectangular optical cable fixed to the field assembled optical connector according to the first embodiment of the present invention.

As illustrated in FIGS. 1 to 3, the field assembled optical connector according to the first embodiment of the present invention includes a connector housing 80, a plug 10, a boot cover 20, a screw cap 70, an optical connection member 30, and a ferrule 90.

As the plug 10 is inserted into the connector housing 80, the connector housing 80 covers a circumference of the plug 10 to protect the below-described optical connection member 30 inserted within the plug 10.

The plug 10 has an accommodation part 11 at a front side thereof inserted into the connector housing 80, and a boot 12 for fixing an optical cable 100 inserted into the plug 10 is integrally formed at a rear side of the accommodation part 11.

The accommodation part 11 is configured to accommodate the below-described optical connection member 30. As illustrated in FIG. 1, a central portion of the accommodation part 11 is opened so that the optical connection member 30 accommodated within the accommodation part 11 is exposed to the outside, and a coupling hole 11a is formed on one side of the accommodation part 11 disposed on a side of the boot 12.

Shaft bosses 13 for coupling of the below-described boot cover 20 are formed on right and left side walls of the accommodation part 11.

The boot 12 extends integrally from the accommodation part 11 to the rear side and has a tapered semicircular shape. A first screw portion 12a is formed on an outer peripheral surface of the boot 12 and first ring-shaped bosses 12b protruding from an inner surface of the boot 12 are formed along the inner surface of the boot 12. Here, the first ring-shaped bosses 12b are attached to an outer sheath of the optical cable 100 inserted into the boot 12 to press the optical cable 100.

A rear side of the boot cover 20 has a shape corresponding to the boot 12. A second screw portion 21 corresponding to the first screw portion 12a of the boot 12 is formed on an outer peripheral surface of the boot cover 20 and second ring-shaped bosses 22 corresponding to the first ring-shaped bosses 12b are formed on an inner peripheral surface of the boot cover 20. Shaft boss coupling recesses 23 coupled the shaft bosses 13 of the plug 10 are formed at right and left sides of a front portion of the boot cover 20.

The boot cover 20 is pivoted about the shaft bosses 13 to open and close an inner side of the boot 12 of the plug 10, and presses and fixes the optical cable 100 inserted into the boot 12 together with the boot 12.

As illustrated in FIG. 2, a plurality of press bosses 24a, 24b, and 24c are formed on the second ring-shaped bosses 22 of the boot cover 20.

The plurality of press bosses 24a, 24b, and 24c include first press bosses 24a protruding downward from central portions of surfaces of the second ring-shaped bosses 22, second press bosses 24b formed at left sides of the first press bosses 24a, and third press bosses 24c formed at right sides of the second press bosses 24b.

A distance between the second press bosses 24b and the third press bosses 24c is the same as a diameter of a circular optical cable 100 inserted into the boot 12 and the boot cover 20. If the circular optical cable 100 is inserted into the boot 12 and the boot cover 20, the second press bosses 24b and the third press bosses 24c press a circumference of the circular optical cable 100 to prevent separation of the optical cable 100.

The screw cap 70 is screw-coupled to the first screw portion 12a and the second screw portion 21 of the boot 12 and the boot cover 20, so that the optical cable 100 inserted into the boot 12 and the boot cover 20 with the boot cover 20 being closed to be fixed. A hole 71 for inserting the optical cable 100 is formed at an end of the screw cap 70.

The optical connection member 30 is inserted into the plug 10 to connect an optical fiber 91 of the ferrule 90 and an optical fiber 101 of the optical cable 100, and includes an optical connection housing 41, an optical connection housing cover 51, and an optical connection housing holder 61.

A ferrule insertion part 42 into which the ferrule 90 is inserted and fixed is formed on a front side of the optical connection housing 41, an optical fiber insertion part 43 into which the optical fiber 101 of the optical cable is inserted is formed on a rear side of the optical connection housing 41. An open-topped optical fiber connection part 44 having an optical fiber connection recess 44a on which the optical fiber 91 of the ferrule 90 and the optical fiber 101 of the optical cable 100 are positioned to be connected to each other is integrally formed between the ferrule insertion part 42 and the optical fiber insertion part 43.

A tapered annular boss 43a coupled to the coupling hole 11a of the plug 10 to fix the optical connection housing 41 within the accommodation part 11 of the plug 10 is formed at an end of the optical fiber insertion part 43. Here, the annular boss 43a is exposed to the inner side of the boot 12 while being coupled to the coupling hole 11a.

The optical connection housing cover 51 is coupled at an upper side of the optical fiber connection part 44 to cover the optical fiber connection part 44, and presses the optical fibers 91 and 101 connected within the optical fiber connection recess 44a to prevent separation of the optical fibers 91 and 101. A protrusion protruding upward and formed lengthwise is formed at one side of an upper surface of the optical connection housing cover 51.

Coupling recesses 44b are formed at right and left ends of the optical fiber connection part 44 of the optical connection housing 41, and coupling bosses 52 are formed at right and left ends of the optical connection housing cover 51 at locations corresponding to the coupling recesses 44b. Accordingly, the optical connection housing 41 and the optical connection housing cover 51 are coupled to each other by the coupling recesses 44b and the coupling bosses 51.

A first guide groove 45 and a second guide groove 54 are formed in the optical fiber connection part 44 and the optical connection housing cover 51.

The first guide groove 45 is inclinedly formed toward the optical fiber connection recess 44a at both sides of the optical fiber connection recess 44a to guide the optical fibers 91 and 101 entering the optical connection part 44 to the optical fiber connection recess 44a.

The second guide groove 54 is inclinedly formed toward the optical connection recess 44a at both ends of the optical connection housing cover 51 to guide the optical fibers 91 and 101 to the optical fiber connection recess 44a together with the first guide groove 45.

Here, the second guide groove 54 is formed longer than the first guide groove 45, and a front side of the second guide groove 54 which becomes narrower is located in front of a front side of the first guide groove 45, both corresponding to each other.

As the optical connection housing 41 and the optical connection housing cover 51 are inserted into the optical connection housing holder 61, an inner peripheral surface of the optical connection housing holder 61 is coupled to cover the optical connection housing 41 and the optical connection housing cover 51 and press the optical connection housing cover 51. Then, an inner upper side of the optical connection housing holder 61 contacts and presses the protrusion 53 of the optical connection housing cover 51 to press the optical connection housing cover 51.

The inner upper side of the optical connection housing holder 61 contacting the protrusion 53 is inclined upward toward a progress direction, i.e. a direction of proceeding toward the ferrule insertion part 42 of the optical connection housing 41. Accordingly, when proceeding toward the front side of the optical connection housing 41, the inner upper side of the optical connection housing holder 61 presses the protrusion. Meanwhile, when moving rearward, the inner upper side of the optical connection housing holder 61 is separated from the protrusion 53.

The reference numeral C denotes a ferrule protecting cap for protecting the ferrule 90.

Hereinafter, a connecting process of optical fibers will be described in more detail so that the features and advantages of the field assembled connector according to the first embodiment of the present invention can be spotlighted.

First, in an assembled state, the optical connection member 30 is inserted into the plug 10 and located within the accommodation part 11. Then, an inner upper side of the optical connection housing holder 61 is spaced apart from the protrusion 53 on an upper surface of the optical connection housing cover 51 while being retreated toward the optical fiber insertion part 43 of the optical connection housing 41.

The boot cover 51 is coupled to the boot 12 of the plug 10. The connector housing 80 and the screw cap 70 are separated from each other because they are completely coupled to each other after the optical fibers 91 and 101 are connected.

In this state, the ferrule 90 is inserted into the ferrule insertion part 42 of the optical connection housing 41. In the process of inserting the ferrule 90, the optical fiber 91 of the ferrule 90 is guided to an inner side of the optical fiber connection recess 44a by the first guide groove 45 and the second guide groove 54 corresponding to each other at upper and lower sides, and is positioned in the optical fiber connection recess 44a.

Then, since a front side of the second guide groove 54 which becomes narrower is located in front of the first guide groove 45, it is safely guided to the optical fiber connection recess 44a by a front side of the second guide groove 54 when the optical fiber 91 passes by the front side of the first guide groove 45.

Next, the optical fiber 101 of the optical cable 100 is inserted into the optical fiber insertion part 43 of the optical connection housing 41. Then, since the annular boss 43a of the optical fiber insertion part 43 is coupled to the coupling hole 11a of the accommodation part 11 of the plug 10 to be exposed to the boot 12, the boot 20 is pivoted upward so that an inner side of the boot 12 is opened, making it possible to easily insert the optical fiber 101 of the optical cable 100 into the optical fiber insertion part 43 while confirming an end of the optical fiber insertion part 43 by the naked eye.

Then, the optical cable 100 is inserted into the hole 71 of the screw cap 70 in advance.

As in the process of inserting the optical fiber 91 of the ferrule 90, the optical fiber 101 of the optical cable 100 inserted into the optical fiber insertion part 43 is safely guided to and positioned on an inner side of the optical fiber connection recess 44a by the first guide groove 45 and the second guide groove 54.

After ends of the optical fibers 91 and 101 are arranged within the optical fiber connection recess 44a to correspond to each other, the optical fiber housing holder 60 is moved forward to press and fix the optical fibers 91 and 101 connected to each other as in FIG. 4.

Then, if the optical fiber housing holder 61 is moved forward, an inner upper side of the optical fiber housing holder 61 contacts the protrusion 53 of the optical fiber housing cover 51 to press the optical fiber housing cover 51 and the optical fiber housing cover 51 presses the optical fibers 91 and 101 connected within the optical fiber connection recess 44a.

If the optical fibers 91 and 101 are completely arranged and connected, after the boot cover 20 closes the boot 12, the screw cap 70 fastens the boot 12 and the boot cover 20. Accordingly, the sheath of the optical cable 100 located within the boot 12 and the boot cover 20 is pressed by the ring-shaped bosses 12b and 22.

At the same time, the optical cable 100 is fixed by the press bosses 24a, 24b, and 24c formed on the second ring-shaped boss 22 on the inner side of the boot cover 20. As illustrated in FIG. 5, the first central press bosses 24a press an upper central portion of the optical cable 100, and the second press bosses 24b and the third press bosses 24c are attached to a circumference of the optical cable 100 to press right and left sides of the optical cable 100.

Accordingly, the optical cable 100 is located within the plug 10, while being firmly fixed within the boot 12 and the boot cover 20 by the plurality of ring-shaped bosses 12b and 22 and the plurality of press bosses 24a, 24b, and 24c without any right or left gap.

Finally, the plug 10 is inserted into the connector housing 80 to complete the optical connection and the assembling process.

Although a process of fixing the circular optical cable 100 has been described as illustrated in the drawings, the field assembled optical connector according to the first embodiment of the present invention may firmly fix a rectangular optical cable 200 for optical connection.

That is, if the rectangular optical cable 200 is inserted into the hole 71 of the screw cap 70 and into the boot 12 and the boot cover 20, and the screw cap 70 is fastened to the boot 12 and the boot cover 20, the second press boss 24b and the third press boss 24c formed in the boot cover 20 around an upper corner of the optical cable 200 press the optical cable 200 as illustrated in FIG. 6.

Accordingly, the optical cable 200 may be located within the plug 10 while being very firmly fixed within the boot 12 and the boot cover 20 without any right or left gap.

Meanwhile, although not illustrated, when an optical cable having a diameter of 0.9Ø, a circular rubber tube having a through-hole at a central portion thereof is fixed between the boot and the boot cover with the optical cable being inserted into the rubber tube, making it easy to fix an optical cable having a small diameter.

Next, the second embodiment of the present invention will be described in detail with reference to the accompanying drawings.

Figure 7:
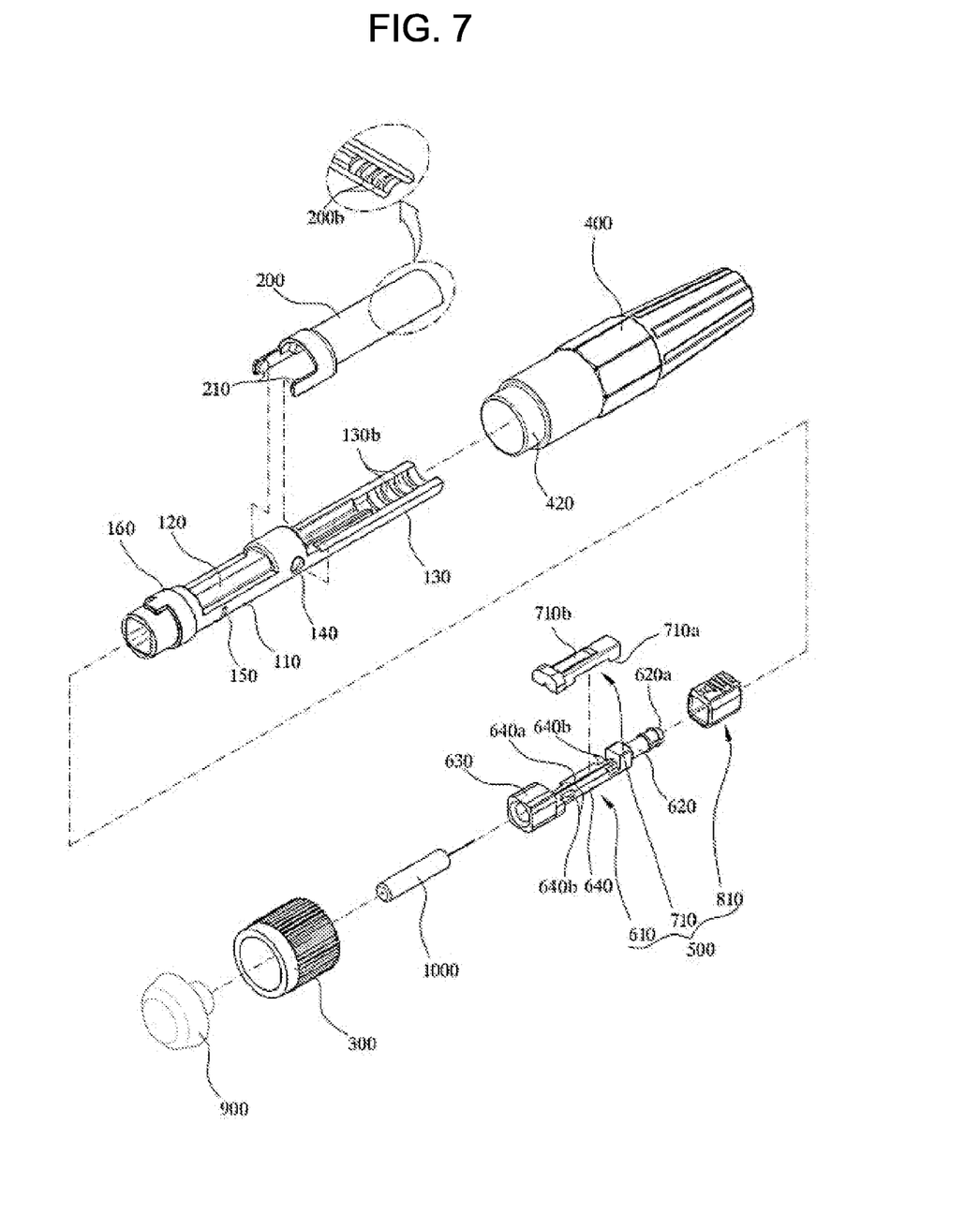
FIG. 7 is an exploded perspective view illustrating an FC type field assembled optical connector according to the second embodiment of the present invention.
Figure 8:
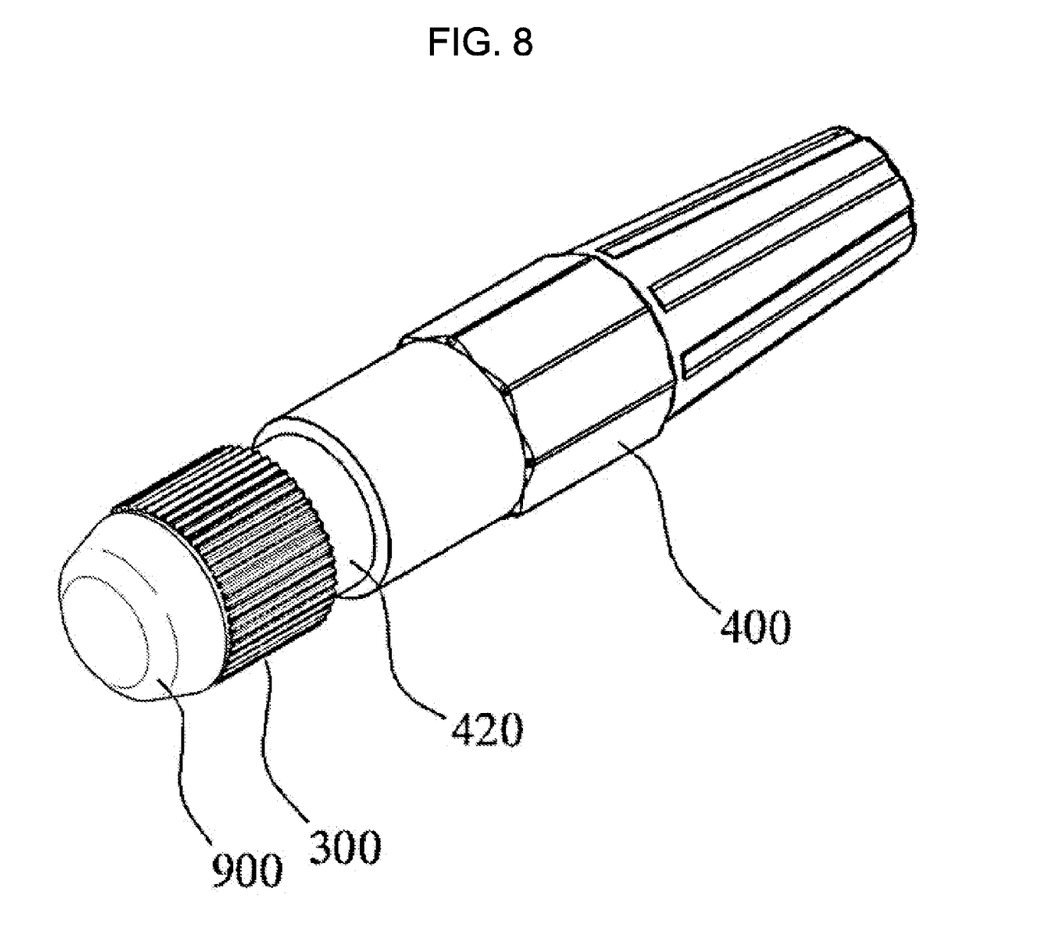
FIG. 8 is a perspective view illustrating the FC type field assembled optical connector according to the second embodiment of the present invention.
Figure 9:
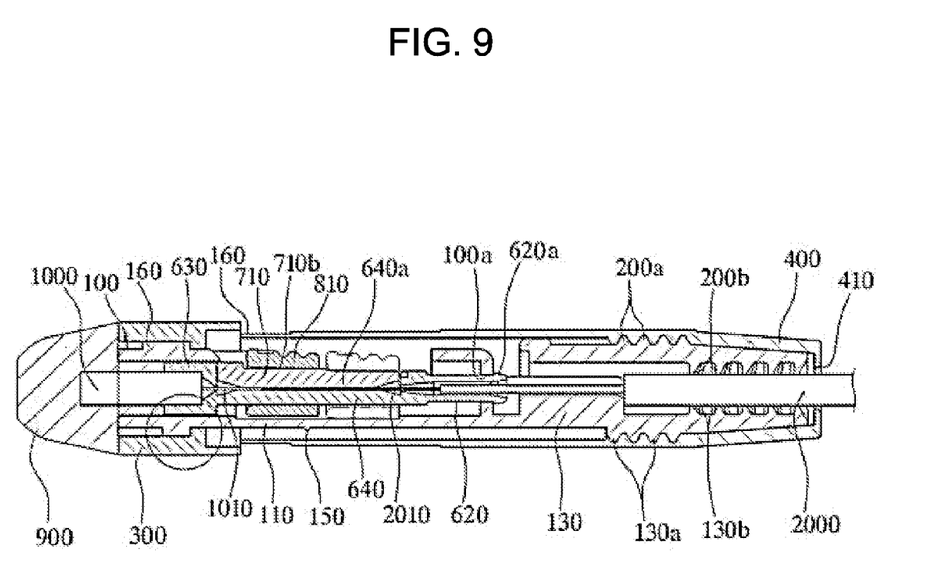
FIG. 9 is a sectional view illustrating a state where the FC type field assembled optical connector according to the second embodiment of the present invention is assembled and optical fibers are connected to the optical connector.

FIG. 7 is an exploded perspective view illustrating an FC type field assembled optical connector according to the second embodiment of the present invention. FIG. 8 is a perspective view illustrating the FC type field assembled optical connector according to the second embodiment of the present invention. FIG. 9 is a sectional view illustrating a state where the FC type field assembled optical connector according to the second embodiment of the present invention is assembled and optical fibers are connected to the optical connector.

As illustrated in FIGS. 7 to 9, the field assembled optical connector according to the embodiment of the present invention includes a ferrule 1000, a plug 1000, a boot cover 2000, a screw cap 400, an optical connection member 500, a housing 300, and a protection cap 900.

A housing coupling part 110 is formed at one side of the plug 1000, and a boot 130 for fixing an optical cable 2000 inserted into the plug 1000 is integrally formed at a front side of the housing coupling part 110.

As illustrated in FIG. 7, the housing coupling part 110 and the boot 130 are open-topped, and the housing coupling part 110 has an accommodation part 120 therein. A cover coupling recess 140 is formed on an outer peripheral surface between the boot 130 and the housing coupling part 110, and coupling holes 110a are formed at one side of the accommodation part 120, i.e. on a side of the boot 130. An annular boss 150 is formed at a lower circumference of an outer peripheral surface of the housing coupling part 110, and an annular separation preventing step 160 adjacent to the annular boss 150 is formed on one side of the annular boss 150, i.e. on a rear side of the annular boss 150.

The boot 130 integrally extends from the housing coupling part 110 to the front side and has a semi-circular tapered shape. A first screw portion 130a is formed on an outer peripheral surface of the boot 130, and first protruding press bosses 130b formed along an inner surface of the boot 130 are formed on an inner peripheral surface of the boot 130. Here, the first press bosses 130b are attached to an outer sheath of the optical cable 2000 inserted into the boot 130 to press the optical cable 2000.

A second screw portion 200a corresponding to the first screw portion 130a of the boot 130 is formed on an outer peripheral surface of a boot cover 2000, and second press bosses 200b corresponding to the first press bosses 130b are formed on an inner peripheral surface of the boot cover 2000.

Shaft bosses 210 coupled to cover coupling recesses 140 are formed at right and left sides of the rear side of the boot cover 2000.

The boot cover 2000 opens and closes an inner side of the boot 130 while pivoting upward and downward about the shaft bosses 210, and presses and fixes the optical cable 2000 inserted into the boot 130 together with the boot 130.

The housing 300 has a circular ring shape and is coupled to the housing coupling part 110 of the plug 1000. An annular ring portion 310 is formed at one side of an inner peripheral surface of the housing 300.

The screw cap 400 is coupled to the boot 130 and the boot cover 2000 to fix a closed state of the boot cover 200 and press the optical cable 1000 inserted into the boot 130 and the boot cover 2000 to fix the optical cable 1000. A hole for insertion of the optical cable 2000 is formed at an end of the screw cap 400.

A front side of the screw cap 400 is formed by a length long enough to cover the optical connection member 500 coupled to the plug 1000 and inserted into the plug 1000. An extension 420 for moving the housing 300 forward is formed on a front side thereof to push the housing 300 forward so that the annular ring portion 110 of the housing 300 passes by the annular boss 150 of the housing coupling part 110 to be coupled between the separation preventing step 160 and the annular boss 150 when coupled to the plug 1000.

The optical connection member 500 is inserted into the plug 1000 to connect optical fibers 1010 and 2010 of the ferrule 1000 and optical fibers 1010 and 2010 of the optical cable 2000, and includes an optical connection housing 610, an optical connection housing cover 2000, and an optical connection housing holder 810.

A ferrule insertion part 630 into which the ferrule 1000 is inserted and fixed is formed on a rear side of the optical connection housing 610, an optical fiber insertion part 620 into which the optical fibers 1010 and 2010 of the optical cable 2000 is inserted is formed at a front side of the optical connection housing 610. A open-topped optical fiber connection part 640 having an optical fiber connection recess 640a on which the optical fiber 1010 of the ferrule 1000 and the optical fiber 2010 of the optical cable 2000 are positioned to be connected to each other is integrally formed between the ferrule insertion part 630 and the optical fiber insertion part 620.

An annular boss 620a tapered toward an end thereof which is coupled to the coupling hole 100a of the plug 1000 to fix the optical connection housing 610 within the accommodation part 120 of the plug 1000 is formed at an end of the optical fiber insertion part 620. Here, the annular boss 620a is exposed to an inner side of the boot 130 while being coupled to the coupling hole 100a.

The optical connection housing cover 2000 is coupled to an upper side of the optical fiber connection part 640 to cover the optical fiber connection part 640, and presses the optical fibers 1010 and 2010 connected within the optical fiber connection recess 640a to prevent separation of the optical fibers 1010 and 2010. A protrusion 710b protruding upward and formed lengthwise is formed at one side of an upper surface of the optical connection housing cover 2000.

Here, coupling recesses 640b are formed at right and left ends of the optical fiber connection part 640 of the optical connection housing 610, and coupling bosses 710a are formed at locations corresponding to the coupling recesses 640b formed at right and left ends of the optical connection housing cover 2000. Accordingly, the optical connection housing 610 and the optical connection housing cover 2000 are coupled by the coupling recesses 640b and the coupling bosses 710a.

An optical connection housing holder 810 is coupled such that an inner peripheral surface of the optical connection housing holder 810 surrounds the optical connection housing 610 and the optical connection housing cover 2000 as the optical connection housing 610 and the optical connection housing cover 200 are inserted into the optical connection housing holder 810 to press the optical connection housing cover 2000. Then, an inner upper side of the optical connection housing holder 810 contacts the protrusion 710b of the optical connection housing cover 2000 and pushes the protrusion 710b to press the optical connection housing cover 2000.

An inner upper side of the optical connection housing holder 810 contacting with the protrusion 710b is inclined upward toward a progress direction, i.e. a direction of progressing toward the ferrule insertion part 630 of the optical connection housing 610. Accordingly, when proceeding toward the optical connection housing, the inner upper side of the optical connection housing holder 810 pushes the protrusion 710b. When moved rearward, the inner upper side of the optical connection housing holder 810 is separated from the protrusion 710b.

The protection cap 900 is coupled to a rear side of the plug 1000 to protect the ferrule 1000.

Hereinafter, a connecting process of optical fibers will be described in more detail so that the features and advantages of the field assembled connector according to the second embodiment of the present invention can be spotlighted.

First, in an assembled state, the optical connection member 300 is inserted into the plug 1000 and located within the accommodation part 110. Then, an inner upper side of the optical connection housing holder 600 is spaced apart from the protrusion 530 on an upper surface of the optical connection housing cover 510 while being retreated toward the optical fiber insertion part 430 of the optical connection housing 410 close.

The housing 300 is located at one side of the annular boss 150, i.e. on a side of the boot 130, and the boot cover 510 is coupled to the boot 120 of the plug 1000. The protection cap 900 and the screw cap 400 are completely coupled to each other after connection of the optical fibers 1010 and 2010, and are currently separated from each other.

In this state, the ferrule 1000 is inserted into the ferrule insertion part 420 of the optical connection housing 410 and is positioned within the optical fiber connection recess 640a.

Next, the optical fiber 2010 of the optical cable 2000 is inserted into the optical fiber insertion part 620 of the optical connection housing 610. Then, since the annular boss 620a of the optical fiber insertion part 620 is coupled to the coupling hole 100a of the accommodation part 120 of the plug 10000 to be exposed to the boot 130, the boot 2000 is pivoted upward so that an inner side of the boot 130 is opened, making it possible to easily insert the optical fiber 2010 of the optical cable 2000 into the optical fiber insertion part 620 while confirming an end of the optical fiber insertion part 620 by the naked eye.

Then, the optical cable 2000 is inserted into the hole 410 of the screw cap 400 in advance.

In this way, after ends of the optical fibers 1010 and 2010 are arranged within the optical fiber connection recess 640a to correspond to each other, the optical housing holder 810 is moved forward to press and fix the optical fibers 1010 and 2010 connected to each other.

Then, if the optical fiber housing holder 810 progresses, an inner upper side of the optical fiber housing holder 810 contacts the protrusion 710b of the optical fiber housing cover 710 to press the optical fiber housing cover 710, and the optical fiber housing cover 710 presses the optical fibers 1010 and 2010 connected within the optical fiber connection recess 640a.

In this way, if the optical fibers 1010 and 2010 are completely arranged and connected, after the boot cover 2000 closes the boot 130, the screw cap 400 fastens the boot 130 and the boot cover 2000.

In this process, the extension 420 in front of the screw cap 400 corresponds to the housing 300, and if the screw cap 400 continues to be fastened, the housing 300 passes by the annular boss 150 to be moved toward the separation preventing step 160. If the screw cap 400 is completely fastened, the extension 420 presses the housing 300 so that the housing 300 is supported by the separation preventing step 160. The screw cap 400 fully covers the optical connection member 500 inserted within the plug 1000 to protect the optical connection member 500.

Finally, the ferrule 1000 is protected through a process of coupling the protection cap 900 to a rear side of the plug 1000, completely assembling the optical connector.

It is apparent that the present invention is not limited to the embodiments of the present invention, considering the objectives and technical spirits of the present invention, and a technical level which can be easily conceived of from the present invention pertains to the scope of the present invention. The equivalents to the present invention such as commercial modification in design, a change in shapes, a change in materials, a change in the number of parts, a change in colors, and a technology pertaining to a lower concept of the present invention will not be listed one by one.

What is claimed is:

1. A field assembled optical connector comprising:
a ferrule having an optical fiber at a center thereof;
a plug integrally forming a housing coupling part formed at one side thereof, and an open-topped boot into which an optical cable is inserted;
an optical connection member inserted into and fixed to the plug to connect an optical fiber of the ferrule inserted at a tip end side and an optical fiber of the optical cable inserted at a rear end side therein;
a boot cover rotatably coupled to the plug on a side of the open-topped boot to open and close an opened upper side of the open-topped boot while pivoting upward and downward and fix the optical cable together with the open-topped boot;
a screw cap screw-coupled to the open-topped boot and the boot cover to fix the optical cable inserted into the open-topped boot and the boot cover; and
a plurality of annular bosses arranged at inner sides of the open-topped boot and the boot cover and attached to an outer sheath of the optical cable inserted into the open-topped boot to press the optical cable while being spaced apart from each other by a predetermined distance.

2. The field assembled optical connector as claimed in claim 1, wherein the boot cover has press bosses protruding toward the open-topped boot on at least one of the ring annular bosses formed at an inner side thereof.

3. The field assembled optical connector as claimed in claim 2, wherein the press bosses include:
a first press boss disposed at a central portion of the annular bosses;
a second press boss disposed on a left side of the first press boss; and a third press boss disposed on a right side of the first press boss, wherein the second press boss and the third press boss are spaced apart from each other at an interval equal to a diameter of a circular optical cable inserted into the open-topped boot.

4. The field assembled optical connector as claimed in claim 1, wherein the optical connection member includes:

an optical connection housing including a ferrule insertion part formed at a front side thereof, an optical fiber insertion part formed at a rear side thereof, and an open-topped optical fiber connection part having an optical fiber connection recess integrally formed between the ferrule insertion part and the optical fiber insertion part to connect the optical fiber of the ferrule and the optical fiber of the optical cable;

an optical connection housing cover coupled to the optical fiber connection part at an upper side thereof to cover the optical fiber connection part and press the optical fibers connected within the optical fiber connection recess;

an optical connection housing holder coupled to the optical connection housing so that an inner peripheral surface thereof surrounds the optical connection housing and the optical connection housing cover, to press the optical connection housing cover.

5. The field assembled optical connector as claimed in claim 4, wherein a protrusion protruding upward is formed lengthwise at one side of an upper surface of the optical connection housing cover, and the optical connection housing holder is moved toward a front side of the optical connection housing so that an inner upper side thereof pushes the protrusion to press the optical connection housing cover.

6. The field assembled optical connector as claimed in claim 5, wherein an inner surface of the optical connection housing holder contacting the protrusion is inclined upward toward a progress direction.

7. The field assembled optical connector as claimed in claim 4, wherein the optical connection member includes:

a first guide groove inclined toward the optical fiber connection recess at both sides of the optical fiber connection recess to guide the optical fibers entering the optical fiber connection part to the optical fiber connection recess; and a second guide groove inclined toward the optical fiber connection recess at both ends of the optical connection housing cover to guide the optical fibers to the optical fiber connection recess together with the first guide groove.

8. The field assembled optical connector as claimed in claim 7, wherein the second guide groove is formed longer than the first guide groove such that a front side of the second guide groove which becomes narrower is located in front of a front side of the first guide groove.

9. The field assembled optical connector as claimed in claim 8, wherein the plug has a coupling hole formed in the accommodation part toward the open-topped boot, and a tapered annular boss coupled to the coupling hole to fix the optical connection housing within the accommodation part is formed at an end of the optical fiber insertion part of the optical connection housing.

10. The field assembled optical connector as claimed in claim 9, wherein the tapered annular boss is exposed to an inner side of the open-topped boot while being coupled to the coupling hole.

11. A field assembled optical connector comprising:
a ferrule having an optical fiber at a center thereof;
a connector housing;
a plug having an accommodation part inserted into and coupled to the connector housing at one side thereof, and an open-topped boot integrally formed at one side of the accommodation part and having a first screw portion on an outer peripheral surface thereof to press and fix an optical cable;

an optical connection member for connecting an optical fiber of the ferrule inserted into the plug to be fixed and inserted from a tip end side thereof and an optical fiber of the optical cable inserted at a rear end side thereof therein;

a boot cover having a second screw portion corresponding to the first screw portion on an outer peripheral surface thereof and pivotally coupled to the plug on a side of the open-topped boot to open and close an opened upper side of the open-topped boot while pivoting upward and downward and fix the optical cable together with the open-topped boot; and a screw cap screw-coupled to the open-topped boot and the boot cover to fix the optical cable inserted into the open-topped boot and the boot cover, wherein the open-topped boot and the boot cover have a plurality of annular bosses arranged at inner sides of the open-topped boot and the boot cover and attached to an outer sheath of the optical cable inserted into the open-topped boot to press the optical cable while being spaced apart from each other by a predetermined distance, and the boot cover has press bosses protruding toward the open-topped boot on at least one of the annular bosses formed at an inner side thereof.

12. A field assembled optical connector as claimed in claim 11, wherein a shaft boss is formed on an outer peripheral surface of the accommodation part of the plug and a separation preventing step for preventing separation of the housing is formed at a lower side of the shaft boss, a ring portion coupled between the shaft boss and the separation preventing step is formed on an inner peripheral surface of the housing, and an extension is formed at a front side of the screw cap.

13. A field assembled optical connector comprising:
a ferrule having an optical fiber at a center thereof;
a plug integrally forming a housing coupling part formed at one side thereof, and an open-topped boot into which an optical cable is inserted;

an optical connection member inserted into and fixed to the plug to connect an optical fiber of the ferrule inserted from a tip end thereof and an optical fiber of the optical cable inserted from a rear end thereof therein;

a boot cover pivotally coupled to the plug on a side of the open-topped boot to open and close an opened upper side of the open-topped boot while pivoting upward and downward and fix the optical cable together with the open-topped boot; and a screw cap screw-coupled to the open-topped boot and the boot cover to fix the optical cable inserted into the open-topped boot and the boot cover;

a housing coupled to the housing coupling part; and a protection cap coupled to a tip end of the optical connection member to protect the ferrule, wherein an annular boss is formed at one side of a lower circumference of an outer peripheral surface of the housing coupling part, an annular separation preventing step for preventing separation of the housing is formed at one side of the annular boss, an annular ring portion coupled between the annular boss and the separation preventing step is formed on an inner peripheral surface of the housing, a front side of the screw cap is formed by a length long enough to cover the optical connection member coupled to the plug and inserted into the plug, and an extension for moving the housing forward and supporting the housing with the separation preventing step is formed on a front side thereof to push the housing forward so that the annular ring portion of the housing passes by the annular boss of the housing coupling part to be coupled between the separation preventing step and the annular boss when coupled to the plug.

* * * * *